Dec. 19, 1950   A. J. PETZINGER   2,534,925
SCALE-DISTRIBUTION CONTROL FOR MEASURING DEVICES
Filed April 29, 1948
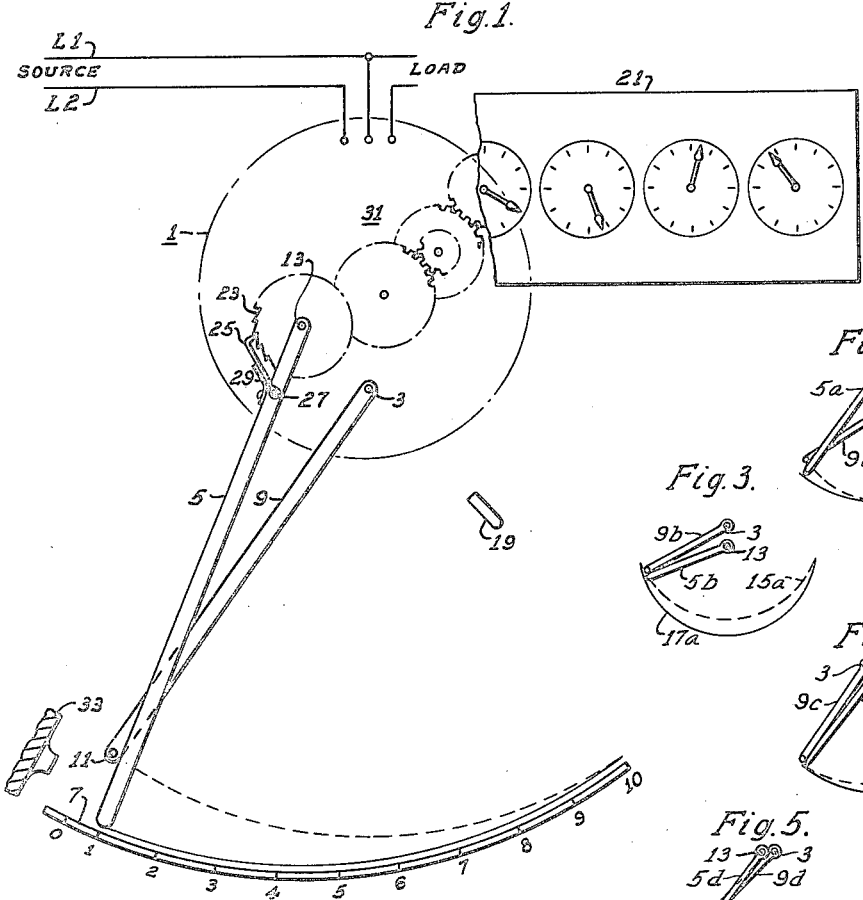
INVENTOR
Ambrose J. Petzinger.
BY
ATTORNEY
WITNESSES:

Patented Dec. 19, 1950

2,534,925

UNITED STATES PATENT OFFICE 2,534,925

SCALE-DISTRIBUTION CONTROL FOR MEASURING DEVICES

Ambrose J. Petzinger, Fair Lawn, N. J., assignor to Westinghouse Electric Corporation, East Pittsburgh, Pa., a corporation of Pennsylvania Application April 29, 1948, Serial No. 24,083

10 Claims. (Cl. 171—34)

This invention relates to measuring devices and it has particular relation to measuring devices having predetermined scale distributions.

In certain measuring devices, it is desirable to provide controls for scale distribution. For example, it is desirable in some cases to provide instruments having inherently linear scale distributions wherein provision is made to provide a non-linear scale distribution when so desired. Furthermore, in other instances, it may be desirable to provide translating means capable of providing a linear scale distribution for an instrument having inherently a non-linear scale distributon.

Also it is desirable to modify at times certain portions of a scale. For this reason it is desirable to provide a structure wherein portions of a scale may be compressed or expanded as desired.

For the purpose of illustrating the invention, specific reference will be made to a thermal meter which has inherently an output which is non-linear with respect to the input thereto. It will be assumed further that the thermal meter is to operate a revolution counter or cumulative register which has an output linearly related to the input thereto.

In accordance with the invention, mechanism is provided between a thermal meter and a cumulative register for the purpose of applying to the cumulative register an input which is linearly related to the input to the thermal meter. To this end, two members are mounted for rotation about spaced parallel axes. One of the members is rotated about its axis by the thermal meter. The member so rotated slidingly engages the second member for actuating the second member about the associated axis. By spacing the axes in a suitable direction for a suitable distance, it is possible to provide the second member with a scale distribution which is substantially linear with respect to the input to the thermal meter. Other scale distributions may be obtained by proper location of the two axes with respect to each other.

The invention contemplates further the provision of a stop for the second member which contributes to accurate operation of the associated cumulative register. If the meter has scale distortion adjacent its zero position, this stop is spaced from the zero position of the associated thermal meter for the purpose of introducing adequate compensation.

The invention further contemplates a resetting mechanism for the second member which permits a resetting operation of the second member and correct operation of the associated register without requiring actuation of the thermal meter to its zero position. To this end a yieldable connection is interposed between the second member and the associated register.

It is, therefore, an object of the invention to provide an improved measuring instrument having a predetermined scale distribution.

It is a further object of the invention to provide a pair of members mounted for rotation about spaced parallel axes and having a sliding engagement with each other at a point spaced from the axes together with a measuring device for actuating a first one of the members, the axes being spaced in a direction and by a distance selected to provide a predetermined scale distribution for the second member.

It is an additional object of the invention to provide apparatus as specified in the preceding paragraph wherein the second member has a linear response relative to the input of the measuring device and wherein the second member actuates a linearly-responsive register.

It is a still further object of the invention to provide apparatus as specified in the preceding paragraph wherein the measuring device is a thermal meter and a stop for the second member is provided which is displaced from the zero position of the thermal meter for the purpose of improving the linearity of the response of the register with respect to the input to the thermal meter.

It is also an object of the invention to provide a thermal meter having a maximum demand pointer and a register actuated by the maximum demand pointer wherein a yieldable connection is interposed between the maximum demand pointer and the register for the purpose of facilitating a resetting operation of the maximum demand pointer.

Other objects of the invention will be apparent from the following description taken in conjunction with the accompanying drawing, in whcih:

Figure 1 is a view in front elevation with parts broken away and parts schematically shown of a measuring device embodying the invention;

Figs. 2 to 5 are detail views showing pointer arrangements suitable for incorporation in the measuring device of Fig. 1;

Fig. 6 is a detail view showing a modified pointer construction suitable for the measuring device of Fig. 1; and Fig. 7 is a view in perspective with parts broken away showing modified resetting mechanism suitable for the measuring device of Fig. 1.

Referring to the drawing, Figure 1 shows a measuring device 1 having an output shaft 3. For the purpose of discussion, it will be assumed that the output shaft 3 has a rotation about its axis which is non-linear with respect to the input to the measuring device. It will be assumed further that the measuring device is a thermal meter similar to that shown in the Vassar Patent 2,323,738. The thermal meter 1 is intended to measure power flowing in an electrical circuit represented by conductors L1 and L2. As a specific example, the conductors may represent a single-phase alternating current circuit for supplying electrical energy from a source to a load.

The shaft 3 may be employed for actuating a pointer 5 to provide a scale distribution represented by a scale 7 which differs from the scale distribution of the shaft 3. To this end a member or arm 9 is secured to the shaft 3 for rotation therewith. This arm 9 has a pin 11 which slidably engages the pointer 5 for actuating the pointer 5 across its associated scale. The pointer 5 is mounted for rotation about a shaft 13. By proper selection of the direction in which the shaft 13 is displaced relative to the shaft 3 and by proper selection of the distance between the shafts, the scale distribution of the pointer 5 may be controlled over a wide range. To illustrate the effect of changes in direction and displacement of the shafts 3 and 13, reference may be made to Figs. 2 and 5.

Referring first to Fig. 2, it will be observed that the shaft 3 is located below the shaft 13. The shaft 3 has secured thereto an arm 9a which corresponds to the arm 9 of Fig. 1. The shaft 13 mounts a pointer 5a which corresponds to the pointer 5 of Fig. 1. During its rotation the tip of the arm 9 follows a dotted curve 15. In a similar manner the tip of the pointer A follows a curve 17. It will be observed that when the tips of the arm and point are adjacent the portions A of the curves 15 and 17, the tips move substantially in unison. However, in its extreme positions the tip of the pointer 5a does not move in unison with the tip of the arm 9a. In effect the scale represented by the curve 15 has been converted into a scale represented by the curve 17 which has expanded end portions.

If the shafts 3 and 13 are interchanged as illustrated in Fig. 3 and are similarly associated with an arm 9b and a pointer 5b, the tips of the arm and pointer follow curves 15a and 17a, respectively. When compared to the scale represented by the curve 15a it will be found that the scale represented by the curve 17a has an expanded center portion.

By moving the shaft 3 to the left of the shaft 13 as shown in Fig. 4, the relative scale distributions for the associated arm 9c and pointer 5c again are changed. The scale for the pointer 5c when compared with the scale for the arm 9c expands as the arm rotates in a counterclockwise direction. Inspection will show that the structure of Fig. 5 may be employed to compress the scale for the pointer 5d (which is mounted on the shaft 13) relative to the scale for the arm 9d (which is mounted on the shaft 3) as the shaft 3 rotates in a counterclockwise direction. In Fig. 5 the shaft 13 is to the left of the shaft 3.

For a thermal meter of the type described in the aforesaid Vassar patent, a scale distribution for the pointer 5 may be obtained which is substantially linear over a substantial range with respect to the input to the thermal meter. As a specific example of dimensions actually encountered, in Fig. 1 the shaft 13 may be located 1/10 of an inch to the left of the shaft 3 and 1/10 of an inch above the shaft 3. For this embodiment the arm 9 is 1¾ inches long, and moves through an arc of about 70°. It will be observed that the compensation employed in the embodiment of Fig. 1 is a combination of the compensations illustrated in Figs. 2 and 5.

The pointer 5 is employed as a maximum demand pointer for indicating the maximum demand of energy supplied from the source to the load to the conductors L1, L2. To this end suitable means 19 may be provided for resetting the maximum demand pointer 5 to a zero position at the end of each period. Such resetting means are disclosed in the aforesaid Vassar patent and will be discussed further below.

In order to retain an indication of the maximum demand after the pointer 5 has been returned to a zero position, a revolution counter or cumulative register 21 is provided. For actuating the register, a ratchet wheel 23 is mounted for rotation about the shaft 13. A pawl 25 is pivoted to a pin 27 secured to the pointer 5 and is biased against the ratchet wheel 23 by means of spring 29. It will be observed that when the pointer 25 is moved in a counterclockwise direction, the pawl 25 moves relatively freely over the ratchet wheel 23. When the pointer 5 is moved in a clockwise direction, the pawl 25 forces the ratchet wheel 23 to rotate with the pointer 5. Rotation of the ratchet wheel is transmitted through suitable gearing 31 to the register 21. Consequently, the register 21 may be calibrated to record the length of the arc traversed by the pointer 5 during a resetting operation or the maximum demand indicated by the pointer 5 immediately prior to the resetting operation.

For some measuring devices such as thermal meters, the first division of a scale differs in length substantially from the remaining divisions of the scale. For example, in Fig. 1, it will be observed that the distance between 0 and 1 markings of the scale is substantially smaller than the length of the remaining divisions thereof. Since the register 21 is linearly responsive to its input, the non-linearity represented by the first division of a scale 7 and introduces a substantial error in the reading of the register 21. To compensate for this discrepancy, a stop 33 is provided which is displaced substantially from the zero position of the pointer 5. The displacement of the stop 33 from the zero position of the pointer 5 is sufficient to compensate for the discrepancy between the first and remaining divisions of the scale 7. This means that when the pointer 5 travels from the position illustrated in Fig. 5 to a position abutting the stop 33, it covers a distance substantially equal to that of any division of the scale to the right of the pointer 5 in Fig. 1.

When the pointer 5 is released after a resetting operation, it is returned by the thermal meter 1 to its zero setting as indicated on the scale 7 or to a higher setting if the meter is energized at the time of resetting. It will be understood that the pointer 5 is frictionally maintained in the position to which it is advanced by the arm 9. Such friction may be provided by the frictional engagement of the shaft 13 by the point 5 or by the engagement of the pawl 25 with the associated ratchet wheel 23. Because of the linearity of the scale 7 and the position of the stop 33, the register 21 at the end of the resetting operation will be advanced by an amount proportional to the maximum demand represented by the pointer 5 at the start of the resetting operation.

If the pointer 5 is to be employed only for indicating the energy being supplied from the source to the load at any desired time, the pawl 25, ratchet wheel 23 and register 21 may be omitted. In addition, the pointer 5 may be provided with a bracket 35 as shown in Fig. 6. The bracket 35 together with the pointer 5 provides a slot within which the pin 11 is free to slide. Consequently, the pointer 5 follows movement of the arm 9 in both counterclockwise and clockwise directions.

In a thermal meter of the type disclosed in the aforesaid Vassar patent, the bimetallic springs oppose with substantial force a resetting operation of the pointer 5. In order to decrease the resetting force required, a construction similar to that illustrated in Fig. 7 may be employed. In this construction, the arm 9 and the pointer 5 of Fig. 1 again are employed and the arm 9 is actuated in the manner discussed with reference to Fig. 1. However, a yieldable coupling is interposed between the pointer 5 and the register 21. This yieldable coupling comprises a lever 37 which is secured to a shaft 39. The shafts 13 and 39 are mounted for independent rotation about the same axis. A spiral spring 41 has its inner end connected to the shaft 39 and its outer end connected through a strip 43 to the pointer 5. The spring 41 biases the lever 37 in a counterclockwise direction relative to the pointer 5 to urge a lug 45 projecting from the lever into engagement with the pointer 5.

The shaft 39 has secured thereto a disc 47 to which a pawl 49 is pivotally secured. The pawl 49 is biased by a spring 51 secured to the disc 47 into engagement with the periphery of a ratchet wheel 53 which is mounted for rotation about the shaft 39. The ratchet wheel 53 is coupled through suitable gearing 55 to the register 21.

In considering the operation of the modification illustrated in Fig. 7, it should be observed that as the arm 9 advances in a counterclockwise direction, it carries with it the pointer 5 and the lever 37. During the resulting movement of the shaft 39, the pawl 49 slips with little resistance over the teeth of the ratchet wheel 53.

At the end of a billing period, the resetting mechanism 19 is operated to engage the lever 37 for the purpose of urging the lever in a clockwise direction. During the resultant movement of the lever and the associated shaft 39, the pawl 49 engages the ratchet wheel 53 to force the ratchet wheel in a clockwise direction, thereby actuating the register 21.

The pointer 5 and the lever 37 move as a unit during the resetting operation until the pointer 5 engages the pin 11 on the arm 9. Continued operation of the resetting mechanism urges the lever 37 and the associated lug 45 away from the pointer 5. This result is achieved for the reason that the spiral spring 41 is substantially weaker than the bimetallic meter springs (not shown) which are connected to the arm 9 through the associated shaft 3. Since the weak spiral spring 41 determines the maximum force opposing a resetting operation, the resetting operation can be completed with the expenditure of a very small force.

Movement of the lever 37 continues until the lever engages a stop 57. The relation between the stop 57 and the lever 37 is similar to that existing between the stop 33 and the pointer 5 in Fig. 1. Continued operation of the resetting mecha-
nism results in a yielding of the resilient resetting wire 19a to clear the lever 37. Thereupon the spring 41 again urges the lugs 45 into engagement with the pointer 5, and the mechanism is in condition for operation during a succeeding billing period.

The resetting mechanism 19 may be of conventional construction and may pass through a cover C for operation by a knob 19b located exteriorly of the cover. It will be noted that in Fig. 1 the resetting mechanism directly engages the pointer 5, whereas, in Fig. 7 the resetting mechanism engages the lever 37.

To illustrate the errors eliminated by the invention as applied to a thermal meter of the type illustrated in the aforesaid Vassar patent, if the reset stop 33 of Fig. 1 were located at the zero position of the pointer 5, the maximum error of the reading of the register 21 would be of the order of 20% of a scale division. By moving the stop in a clockwise direction 1.53°, it was possible to decrease the error to a maximum of ±5% of a scale division. By additionally displacing the shaft 13 from the shaft 3 in the manner hereinbefore discussed, the maximum error or the register 21 was reduced to less than 1% of a scale division for a resetting operation from any point on the scale.

Although the invention has been described with reference to certain special embodiments thereof, numerous modifications falling within the spiirt and scope of the invention are possible.

I claim as my invention:

1. In a measuring device, an operating member, operating mechanism effective when energized by a variable quantity for actuating the operating member about a first axis in accordance with a first function of the quantity, an operated member, means mounting the operated member for rotation about an axis spaced from the first axis, said axes occupying fixed positions relative to each other, said operating member having a part engaging the operated member at a point displaced from a plane containing said axes throughout the range of movement of the members for moving the operating member in response to movement of the operated member, whereby the operated member is actuated in accordance with a second function of the quantity.

2. In a measuring device, an operating member, a measuring movement effective when energized by a variable quantity for moving the operating member about a first axis in accordance with a first function of the variable quantity, an operated member, means mounting the operated member for rotation about an axis substantially parallel to, and spaced from, the first axis, said operating member having a part slidably engaging the operated member at a position for moving the operated member in response to movement of the operating member, said position being displaced from said axes by a distance greater than the spacing of the axes, whereby the operated member is actuated in accordance with a second function of the variable quantity.

3. A measuring device as claimed in claim 2 wherein the first function is non-linear, and wherein the axis are spaced to produce movement of the operated member which is substantially linear with respect to the variable quantity.

4. A measuring device as claimed in claim 2 wherein the measuring movement comprises a thermal meter, and wherein the operating member comprises an arm rotated by the thermal meter substantially non-linearly with respect to the variable quantity, said axes being spaced to produce movement of the operated member which is substantially linear with respect to the variable quantity, and means for portraying the maximum movement of the operated member.

5. A measuring device as claimed in claim 4 wherein the portraying means comprises means for resetting the operated member to a predetermined position, and a cumulative register responsive to movement of the operated member in only one direction.

6. In a measuring device, a thermal wattmeter having a shaft, said wattmeter when energized from an electrical circuit being effective for rotating the shaft about a first axis in accordance with a non-linear function of the power flowing in the circuit, a first arm secured to the shaft for rotation therewith, a second arm mounted for rotation about an axis spaced from and substantially parallel to the first axis, said second arm having a portion spaced from the axes disposed in the path of movement of the first arm for slidable engagement therewith, said axes being spaced in a direction and by an amount selected to make movement of the second arm substantially linear with respect to the power flowing in the electrical circuit from which the wattmeter is energized.

7. A device as claimed in claim 6, wherein the second arm is a maximum demand arm comprising means for maintaining the maximum displacement of the second arm from a predetermined position from which the second arm is urged by the first arm, and resetting means for resetting the second arm to a terminal position adjacent the predetermined position.

8. A device as claimed in claim 7 wherein the angular displacement of the second arm from a position adjacent the predetermined position by the wattmeter for a predetermined increment of power differs substantially from the angular displacement of the second arm for an equal increment of power from positions of the second arm substantially displaced from the predetermined position, said predetermined position being spaced from the terminal position by an amount sufficient to make the resetting movement of the second arm substantially linear with respect to the sum of the increments of power represented by the position of the second arm prior to a resetting operation, and translating means linearly responsive to movement of the second arm during a resetting operation.

9. A measuring device as claimed in claim 6 wherein said portion is displaced from a plane containing said axes substantially throughout the range of movement thereof.

10. A measuring device as claimed in claim 6 wherein said portion is displaced from the second-named axis by a substantial distance, in combination with translating means linearly responsive to the input thereto, and means for energizing the translating means in accordance with movement of the second arm in a predetermined direction.

AMBROSE J. PETZINGER.

REFERENCES CITED

The following references are of record in the file of this patent:

UNITED STATES PATENTS

| Number | Name | Date |
|---|---|---|
| 950,647 | Wohl et al. | Mar. 1, 1910 |
| 1,110,254 | Conklin | Sept. 8, 1914 |
| 1,889,553 | Keinath et al. | Nov. 29, 1932 |
| 2,323,738 | Vassar | July 6, 1943 |

FOREIGN PATENTS

| Number | Country | Date |
|---|---|---|
| 316,220 | Great Britain | Aug. 21, 1930 |